March 2, 1971  J. EBRAHIMI  3,566,690

THERMAL DELAY SEMICONDUCTOR THERMOMETER

Filed Aug. 20, 1969  3 Sheets-Sheet 1

INVENTORS
JALAL EBRAHIMI

BY *Curphey + Erickson*
PATENT AGENTS

INVENTORS
JALAL EBRAHIMI
BY *Curphey & Erickson*
PATENT AGENTS

United States Patent Office 3,566,690
Patented Mar. 2, 1971

3,566,690
THERMAL DELAY SEMICONDUCTOR
THERMOMETER
Jalal Ebrahimi, Ottawa, Ontario, Canada, assignor to
Northern Electric Company Limited, Montreal, Quebec,
Canada
Filed Aug. 20, 1969, Ser. No. 851,688
Int. Cl. G01k 7/00; G01n 25/20
U.S. Cl. 73—339                                    4 Claims

ABSTRACT OF THE DISCLOSURE

A temperature measuring apparatus comprising two semiconductor devices (which may be resistors, diodes or transistors) embedded in a thermally conductive body and separated by a small distance. An A-C input signal is converted by one device into heat energy which flows through the body to the other device, generating an A-C output signal. The phase difference between the two signals is measured and, since the phase difference is temperature dependent, the temperature of the body may thus be determined.

This invention relates to a circuit for the measurement of temperature which is particularly useful when applied to integrated circuit technology.

Prior to this invention, difficulties were encountered in measuring the temperature of a particular element in an integrated circuit. One known and often used method of measuring temperature is by means of a thermocouple. However, this method cannot easily be used in connection with integrated circuits. Such circuits are extremely small and it is often very difficult to affix thermocouple leads to them. The present invention removes this problem by using in the temperature measuring circuit two devices which have been put into the integrated circuit using standard integrated circuit techniques.

Applicant has discovered that the temperature of a thermally conductive body may be ascertained through novel utilization of the fact that the phase of an A-C signal flowing through the body by thermal conduction varies with the temperature of the body.

While it is particularly useful in the realm of integrated circuit technology, this invention is not confined to that field. Thus, it may be employed to measure the temperature of any thermally conductive body, and thereby provides a measurement of the key factor involved in the determination of the thermal parameters of the material.

In accordance with the present invention there is provided a thermally conductive body having a first semiconductor device and a second semiconductor device at a predetermined distance from the first semiconductor device. There is also provided means for operably connecting at least the second semiconductor device to a source of direct-current operating voltage. In addition there is provided means for connecting a source of alternating current across the first semiconductor device which results in a first signal thereacross. The first signal induces by thermal conduction through the body a second signal across the second semiconductor device which is out of phase with the first signal, the phase difference being dependent on the distance of separation of the devices and the temperature of the body. The first and second signals are then connected to a phase comparator means so as to determine the phase difference and thus the temperature of the body.

In various embodiments of the invention, the first and second semiconductor devices may be resistors, diodes, or transistors or any combination thereof.

An example embodiment of the invention will now be described with reference to the accompanying drawings in which.

Figure 1:
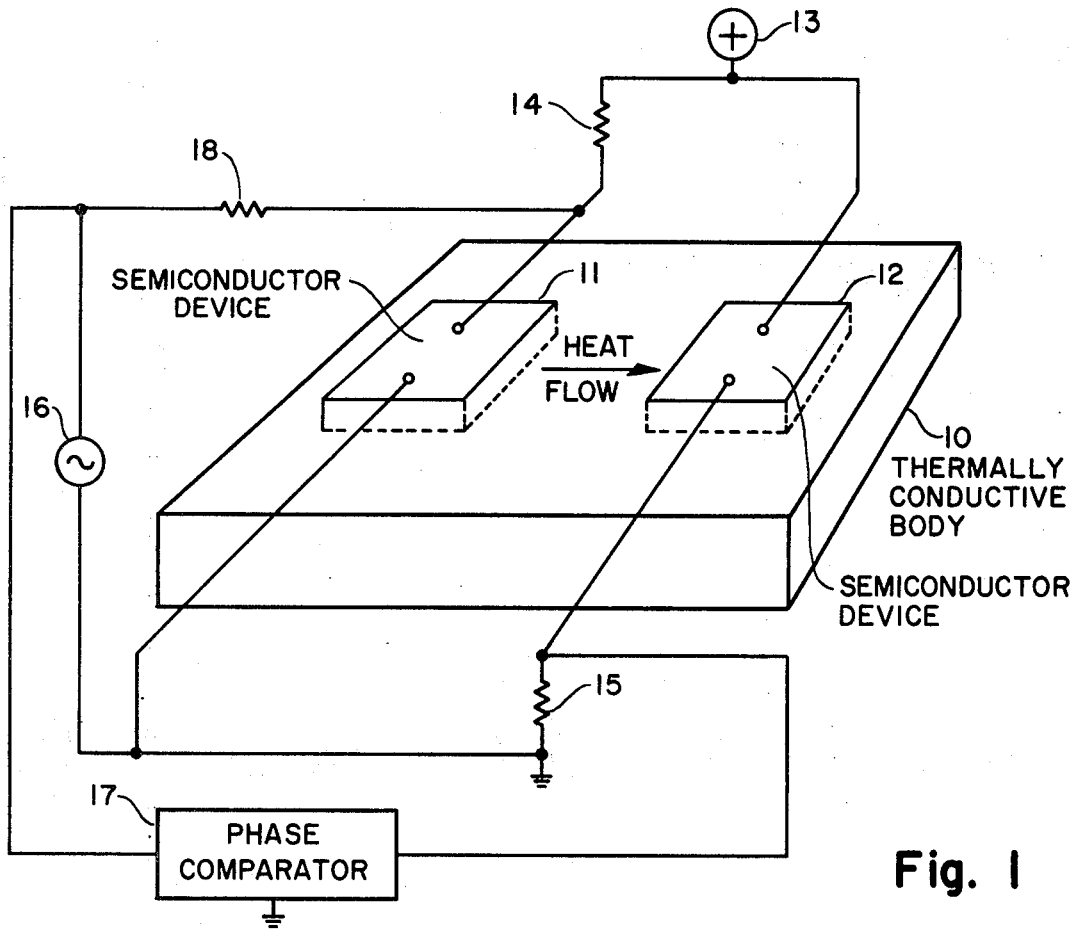
FIG. 1 is a block and schematic diagram of a thermal delay semiconductor thermometer.

Referring to FIG. 1, the thermal delay semiconductor thermometer comprises a thermally conductive body 10 having two semiconductor devices 11 and 12 integrally affixed thereto and at a small predetermined distance apart (in the order of 500 microns). The semiconductor device 11 is connected between ground and a positive terminal of a source of direct-current operating voltage 13 through a small D-C isolating resistor 14. The semiconductor device 12 is connected between ground and the positive terminal of a source of direct-current operating voltage 13 through a load resistor 15. In addition, a signal generator 16 is connected to one input of a phase comparator 17 and also across the semiconductor device 11 through an isolating resistor 18. Selection of the frequency of the signal generated by the signal generator 16 depends on the distance of separation of the semiconductor devices 11 and 12 (at a distance of 500 microns good results are obtained using a frequency of 300 Hz.).

Figure 2:
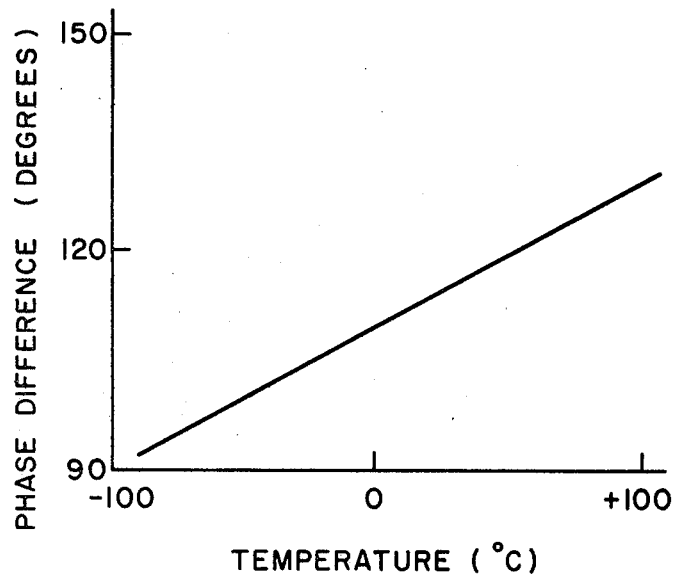
FIG. 2 is a graph exemplifying the relationship of temperature with phase difference for the thermal delay semiconductor thermometer illustrated in FIG. 1.

In operation, a first signal appears across the semiconductor device 11 which is in phase with the signal generated by the signal generator 16. The first signal is converted by the semiconductor device 11 to thermal energy such that an A-C heat flow occurs through the thermally conductive body 10 from device 11 to device 12. This A-C heat flow varies the voltage across the device 12 by changing the temperature dependent carrier concentration in the intrinsic semiconductor material, thus producing a second signal which is out of phase with the first signal due to thermal lag through the thermally conductive body 10. This second signal appears across the load resistor 15 and is fed into the phase comparator 17. The phase difference of the first and second signals is then measured. Since the phase difference depends on the temperature of the thermally conductive body 10, the temperature of the body may thus be determined. FIG. 2 illustrates the linear relationship of phase difference with the temperature of the thermally conductive body 10 in the temperature range —100° C. to +100° C.

Figure 3:
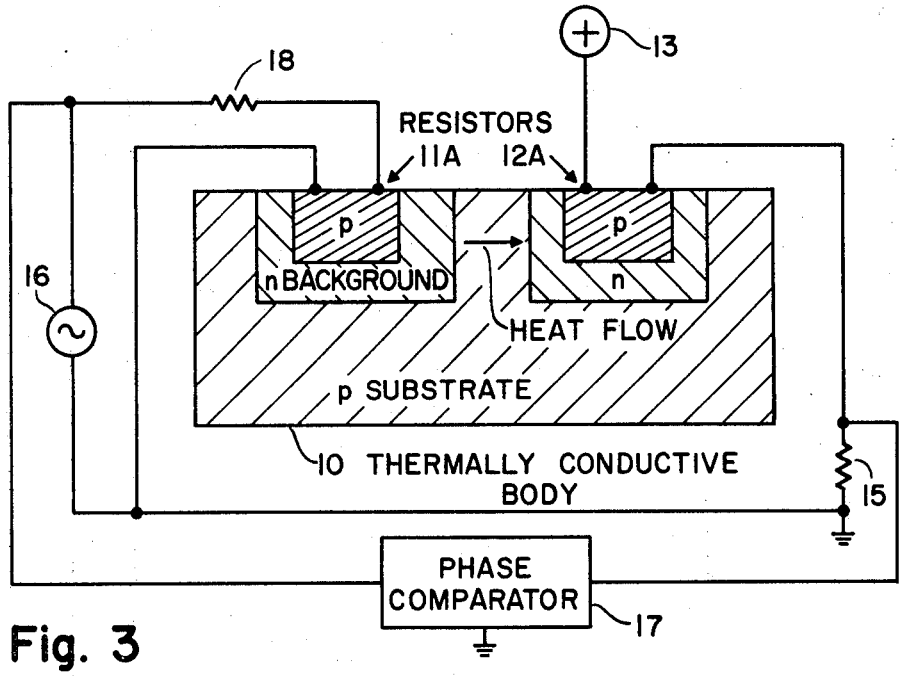
FIGS. 3, 4 and 5 are block and schematic diagrams of the invention illustrated in FIG. 1 in which the first and second semiconductor devices are resistors, diodes and transistors respectively.

FIG. 3 is a block and schematic diagram of one embodiment of the invention wherein the semiconductor devices 11 and 12 of FIG. 1 are now semiconductor resistors 11A and 12A respectively which have been diffused into the thermally conductive body 10 as shown by the cross-sectional view in FIG. 3, using standard integrated circuit techniques. The circuit is identical with that of FIG. 1 with the exception that the resistor 11A need not be and therefore is not connected between ground and the positive source of direct-current operating voltage 13 through a D-C isolating resistor. While the two semiconductor devices must have a good thermal connection, they must be electrically isolated. This is achieved by reverse biasing the p-n junction created by the p-type substrate and the n-type background layer adjacent thereto. This is a commonly used technique for electrically isolating circuitt elements in an integrated circuit.

Figure 4:
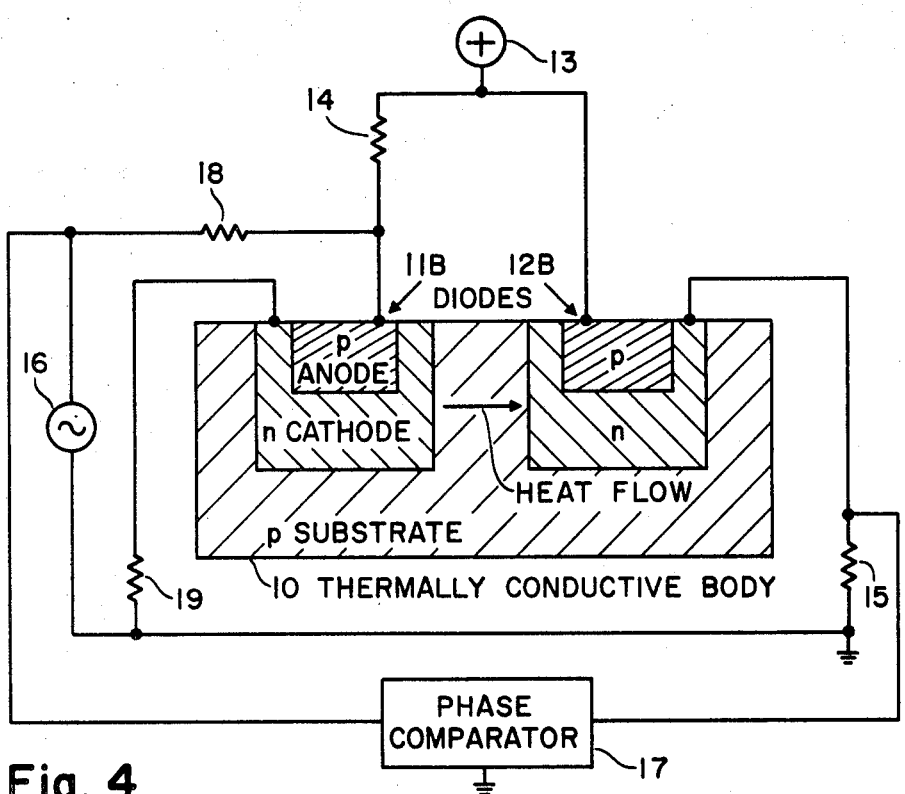

FIG. 4 is a block and schematic diagram of another embodiment of the invention wherein the semiconductor devices 11 and 12 of FIG. 1 are now semiconductor diodes 11B and 12B respectively. The cross-sectional view in FIG. 4 illustrates that the diodes have been diffused into the thermally conductive body 10, using standard integrated circuit techniques. The circuit is identical with that of FIG. 1 with the exception that semiconductor diode 11B has been forward biased by connection of the cathode thereof to ground through a biasing resistor 19.

Figure 5:
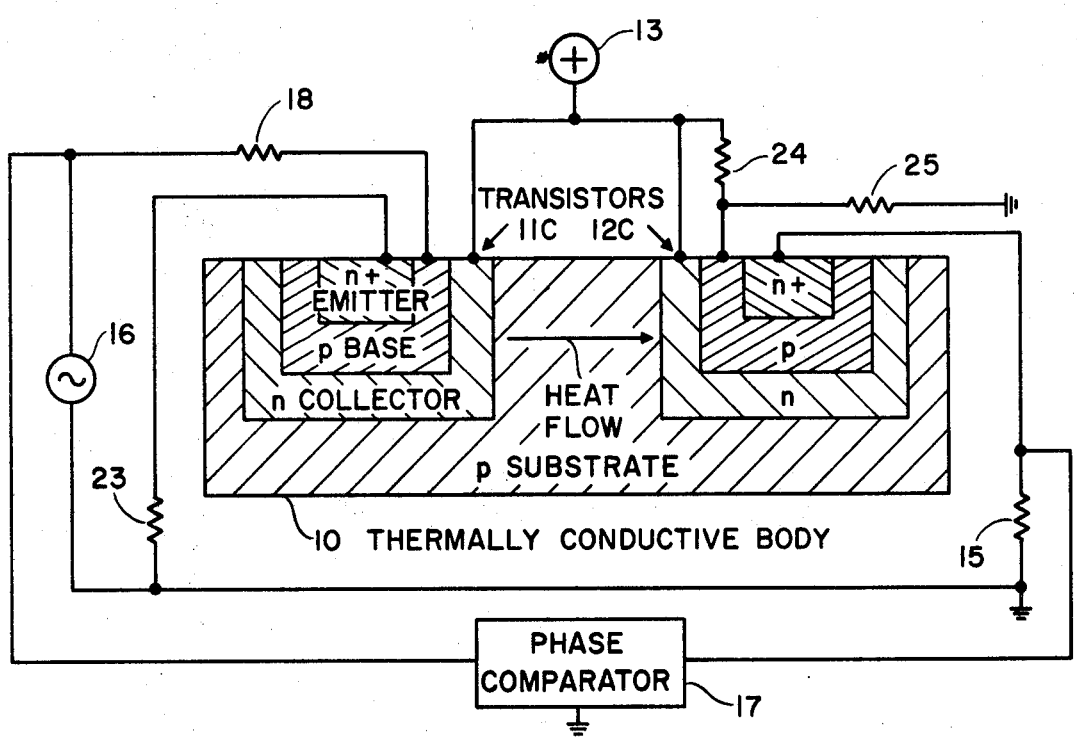

FIG. 5 is a block and schematic circuit diagram of another embodiment of the invention wherein the semiconductor device 11 and 12 of FIG. 1 are now the transistors 11C and 12C respectively which have also been diffused into the thermally conductive body 10 as shown in cross-section. A resistor 23 has been connected between ground and the emitter of the transistor 11C in order to limit the amount of current passing through the emitter. Further, a base bias voltage has been provided for the transistor 12C by connection of a voltage divider between the positive terminal of a source of direct-current operating voltage 13 and ground. The voltage divider comprises the resistors 24 and 25 connected in series, the base of the transistor 12C being connected at the junction of the resistors 24 and 25. In this embodiment of the invention the signal generator 16 is connected to one input of the phase comparator 17 and also across the emitter-base junction of the transistor 11C through an isolating resistor 18, thereby producing a first signal across the collector-base junction thereof. The first signal is converted into thermal energy at the collector-base junction of the transistor 11C such that an A-C heat flow occurs through the thermally conductive body 10 from transistor 11C to transistor 12C. This A-C heat flow varies the voltage across the emitter-base junction of the transistor 12C and produces a second signal which is out of phase with the first signal due to thermal lag through the body. This second signal appears across the resistor 15 and is fed into the phase comparator 17. The phase difference of the first and second signals is then measured, thus permitting a determination of the temperature of the thermally conductive body 10.

The semiconductor devices 11 and 12 of FIG. 1 need not both be resistors, diodes or transistors; any two of these elements may be used together in the circuit.

What is claimed is:
1. A thermal delay semiconductor thermometer comprising:
a thermally conductive body having a first semiconductor device, and having a second semiconductor device at a predetermined distance from the first semiconductor device; means for operably connecting at least the second semiconductor device to a source of direct-current operating voltage; means for connecting a source of alternating current across the first semiconductor device resulting in a first signal thereacross, said first signal inducing by thermal conduction through said body a second signal across the second semiconductor device; and means for comparing the phase of the first and second signals so as to determine the temperature of said thermally conductive body.

2. A thermal delay semiconductor thermometer as defined in claim 1 wherein said first and second semiconductor devices are semiconductor resistors.

3. A thermal delay semiconductor thermometer as defined in claim 1 wherein said first and second semiconductor devices are semiconductor diodes.

4. A thermal delay semiconductor thermometer comprising:
a thermally conductive body having a first transistor, and having a second transistor at a predetermined distance from the first transistor, each of said transistors having emitter, base and collector electrodes and being operably connected to a source of direct-current operating voltage; means for connecting a source of alternating current across the emitter and base electrodes of the first transistor resulting in a first signal across the collector and base electrodes thereof, said first signal inducing by thermal conduction through said body a second signal across the emitter and base electrodes of the second transistor; and means for comparing the phase fo the first and second signals so as to determine the temperature of said thermally conductive body.

References Cited

UNITED STATES PATENTS

| 3,426,596 | 2/1969 | DeBeaumont | 73—339 |
| 3,440,883 | 4/1969 | Lightner | 73—362(SC) |

FOREIGN PATENTS

| 1,222,285 | 8/1966 | Germany | 73—15(COND) |

LOUIS R. PRINCE, Primary Examiner

F. SHOON, Assistant Examiner

U.S. Cl. X.R.

73—15, 362; 307—310